United States Patent
Pettersson et al.

(10) Patent No.: US 11,524,200 B2
(45) Date of Patent: Dec. 13, 2022

(54) ADAPTER ASSEMBLY FOR AN EXERCISE ROPE

(71) Applicant: Snakeheads AB, Falkenberg (SE)

(72) Inventors: Roger Pettersson, Falkenberg (SE); Martin Reynolds, Falkenberg (SE); Krister Lindén, Falkenberg (SE); Ulf Pentéus, Falkenberg (SE)

(73) Assignee: Snakeheads AB, Falkenberg (SE)

( * ) Notice: Subject to any disclaimer, the term of this patent is extended or adjusted under 35 U.S.C. 154(b) by 0 days.

(21) Appl. No.: 16/897,844

(22) Filed: Jun. 10, 2020

(65) Prior Publication Data

US 2020/0391071 A1 Dec. 17, 2020

(30) Foreign Application Priority Data

Jun. 11, 2019 (SE) .................... 1950694-8

(51) Int. Cl.
| | |
|---|---|
| *A63B 21/00* | (2006.01) |
| *A63B 21/08* | (2006.01) |
| *F16G 11/00* | (2006.01) |
| *F16B 7/20* | (2006.01) |
| *A63B 23/035* | (2006.01) |
| *F16G 11/02* | (2006.01) |

(52) U.S. Cl.
CPC ...... *A63B 21/151* (2013.01); *A63B 21/00043* (2013.01); *A63B 21/08* (2013.01); *A63B 21/4035* (2015.10); *A63B 21/4043* (2015.10); *A63B 23/03508* (2013.01); *F16G 11/00* (2013.01); *F16G 11/025* (2013.01); *F16B 7/20* (2013.01)

(58) Field of Classification Search
CPC .. A63B 5/20; A63B 5/205; A63B 5/22; A63B 21/0609; A63B 21/08; A63B 21/151; A63B 21/4035; A63B 21/4043; A63B 23/03508; A63B 23/03525; A63B 7/08; A63B 7/085; F16G 11/00; F16G 11/025; F16G 11/10; A16B 7/20
See application file for complete search history.

(56) References Cited

U.S. PATENT DOCUMENTS

| | | | |
|---|---|---|---|
| 4,736,945 A | 4/1988 | Vinciguerra | |
| 4,836,537 A * | 6/1989 | Moreno ............ | A63B 21/0004 482/139 |
| 4,939,831 A | 7/1990 | Doninger | |

(Continued)

FOREIGN PATENT DOCUMENTS

KR 20040017059 A 2/2004

OTHER PUBLICATIONS

Extended European Search Report (ESSR) for the corresponding European patent application No. 20179286.8 dated Oct. 23, 2020.

*Primary Examiner* — Megan Anderson
(74) *Attorney, Agent, or Firm* — Sandberg Phoenix & von Gontard PC (57) ABSTRACT

An adapter assembly for releasably connecting an accessory connector to an exercise rope is provided. The assembly comprises a connection part being formed by a first portion and a second portion, each having a bottom end and top end, wherein the first and the second portion of the connection part forms, at its bottom end, a cavity configured to receive an end portion of said rope, and wherein the top end of the connection part is configured to releasably connect the accessory connector.

17 Claims, 10 Drawing Sheets

(56) References Cited

U.S. PATENT DOCUMENTS

| | | | |
|---|---|---|---|
| 5,236,405 A | 8/1993 | Dohmann et al. | |
| 6,752,746 B1* | 6/2004 | Winkler | A63B 5/20 |
| | | | 482/126 |
| 7,976,438 B1 | 7/2011 | Hsu | |
| 2014/0141943 A1* | 5/2014 | DiPace | A63B 69/002 |
| | | | 482/93 |
| 2014/0274612 A1 | 9/2014 | Pesko | |
| 2015/0177467 A1 | 6/2015 | Gniadek et al. | |
| 2015/0283421 A1 | 10/2015 | Gaylord | |
| 2017/0203145 A1 | 7/2017 | Proudian | |

* cited by examiner

ADAPTER ASSEMBLY FOR AN EXERCISE ROPE

CROSS-REFERENCE TO RELATED APPLICATIONS

This application claims priority to Swedish Application No. 1950694-8 filed on Jun. 11, 2019, and which is incorporated herein by reference.

TECHNICAL FIELD

The present invention relates to couplings and more precisely to an adapter assembly for releasably connecting an accessory to an exercise rope, and a method for connecting the adapter assembly to the rope.

BACKGROUND

A person can improve his/her physical health and strength in many ways. One tool for improving both cardiovascular fitness and strength is an exercise rope, e.g. a battle rope. An exercise rope is typically between 8 and 15 meters long, 3 to 5 centimeters thick and weighs between 6 and 10 kg. Exercise ropes can be made from both natural fibers and various plastic materials and come in e.g. twisted or braided constructions. Exercise ropes usually have plastic or rubber end sections for use as handles.

In use, the rope may be folded at the center using a post/anchor point. A user holds on to the ends of the two equal lengths of the rope with either hand. Alternatively, one end of the rope is fastened in an anchoring device, and the practitioner use one single rope, or two ropes. The user swings the rope, or ropes, in various ways/directions, either synchronized or unsynchronized, to create waves in the rope. By repeating the movement, the practitioner trains the muscles and cardiovascular system.

The diameter of exercise ropes make exercising difficult for people with smaller hands, especially to hold the ropes for extended times. Accordingly, the diameter of existing exercise ropes limits their usefulness in workout routines. There is thus a need for an exercise rope which can be used for longer periods of time and which is gentler to smaller hands. In addition, there is a need to extend the workout possibilities provided by an exercise rope and to obtain a more ergonomic grip in order to increase effectivity for the practitioners, and potentially avoid injuries among the users.

A known type of exercise rope is disclosed in US20150283421A1, which shows an exercise rope intended to be suitable for persons with smaller hands. A problem with this exercise rope is that, in order to make the rope more comfortable to hold, the diameter is reduced, which means that the weight is reduced as well, meaning that people with smaller hands or weaker grips are limited in the potential intensity of their work out. Since also persons with smaller hands may want to exercise with greater intensity and/or heavier weights, this exercise rope is less effective in providing a challenging workout. It is thus understood that there is room for improvements.

SUMMARY

A new type of adapter assembly is disclosed which is improved over prior art and which eliminates or at least mitigates the drawbacks discussed above. More specifically, the disclosed adapter assembly is simple and easy to use and provides the possibility of exchanging accessories connected to an exercise rope. This is achieved by the technique set forth in the appended independent claims with preferred embodiments defined in the dependent claims related thereto.

In a first aspect, an adapter assembly for connecting an accessory connector to an exercise rope is provided. The assembly comprises a connection part being formed by a first portion and a second portion, each having a bottom end and top end, wherein the first and the second portion of the connection part forms, at its bottom end, a cavity configured to receive an end portion of said rope, and a locking means arranged to connect the first portion and the second portion to each other, and wherein the top end of the connection part is configured to releasably connect the accessory connector. The adapter assembly is advantageous in that it provides a possibility to connect different handles or gears to the exercise rope, making it a more versatile exercising equipment.

The releasable connection between the accessory connector and the top end of the connection part may be provided by means of a bayonet clutch. Another word for bayonet clutch is a bayonet mount. The accessory connector is beneficial in that it is easy to exchange one accessory for another. A bayonet clutch is easily operated and it is at the same time an efficient attachment means. A bayonet clutch is an easy and fast solution that can be repeated almost indefinitely.

In an alternative embodiment the releasable connection between the accessory connector and the top end of the connection part is provided by means of a dovetails rails connection.

In one embodiment, the adapter assembly further comprising a sleeve configured to be arranged on the end portion of the rope and to be received in the cavity created by the connection part. When the sleeve is passed over the connection part, it provides further attachment against the rope.

The sleeve may comprise a shoulder portion configured to interact with an inner surface of the cavity. The cavity of the connection part may comprise an internal circumferential recess in which the shoulder portion on the sleeve is configured to be inserted.

In one embodiment, the connection part is provided with at least one slot. The at least one slot may have a substantially L-shaped design.

The accessory connector may comprise a locking unit having at least one protrusion configured to engage with the connection part. The accessory connector may be connectable to the connection part by means of a bayonet mount formed by the at least one protrusion provided on the connecting portion and the at least one slot provided on the connection part.

The assembly may further comprise a cover configured to cover the interface between the rope and the locking ring.

The accessory and the accessory portion may be integrally formed.

In one embodiment, the exercise rope is a battle rope. It is preferred to exchange accessories to an exercise or battle rope such that the versatility of the rope as an exercise equipment is improved.

In yet a further embodiment a method for releasably connecting an adapter assembly according to the first aspect to an exercise rope is provided. The method comprises the steps of inserting a first end of the rope into a cavity formed by a first portion and a second portion of a connection part, arranging a locking means such that the locking means connects the first and second portions together, wherein the first end of the rope is inserted into a bottom end of the connection part, and releasably engaging an accessory connector to a top end of the connection part.

In one embodiment, the method comprises the steps of inserting a first end of the rope into a sleeve, engaging the sleeve in a connection part, and inserting an accessory connector into a first portion of the connection part such that at least one protrusion of a locking unit of the accessory connector releasably engages at least one slot in the first portion of the connection part.

In one embodiment the locking means is a locking ring. In such an embodiment, the method may comprise the step of passing a locking ring around the first portion and a second portion of the connection part such that locking ring connects the first and second portions together.

The method may further comprise the step of pressing the locking unit of the accessory connector towards the connection part such that the at least one protrusion provided on the locking unit is threaded through a recess of the accessory connector, and rotating the accessory connector such that the at least one protrusion engage with the at least one slot. In an alternative embodiment, the method comprises the step of pushing the locking unit of the accessory connector towards the connection part such that the at least one protrusion provided on the locking unit is advanced through a recess of the accessory connector.

In one embodiment, before the step of inserting the rope into the sleeve, a cover is threaded onto the rope and, subsequently after the rope has been inserted into the sleeve, is moved towards the top end of the sleeve to cover the interface between the rope and the bottom end of the sleeve.

BRIEF DESCRIPTION OF THE DRAWINGS

Embodiments of the invention will be described in the following; references being made to the appended diagrammatical drawings which illustrate non-limiting examples of how the inventive concept can be reduced into practice.

DETAILED DESCRIPTION OF EMBODIMENTS

Hereinafter, certain embodiments will be described more fully with reference to the accompanying drawings. The invention may, however, be embodied in many different forms and should not be construed as limited to the embodiments set forth herein; rather, these embodiments are provided by way of example so that this disclosure will be thorough and complete, and will fully convey the scope of the invention, such as it is defined in the appended claims, to those skilled in the art.

Figure 1:
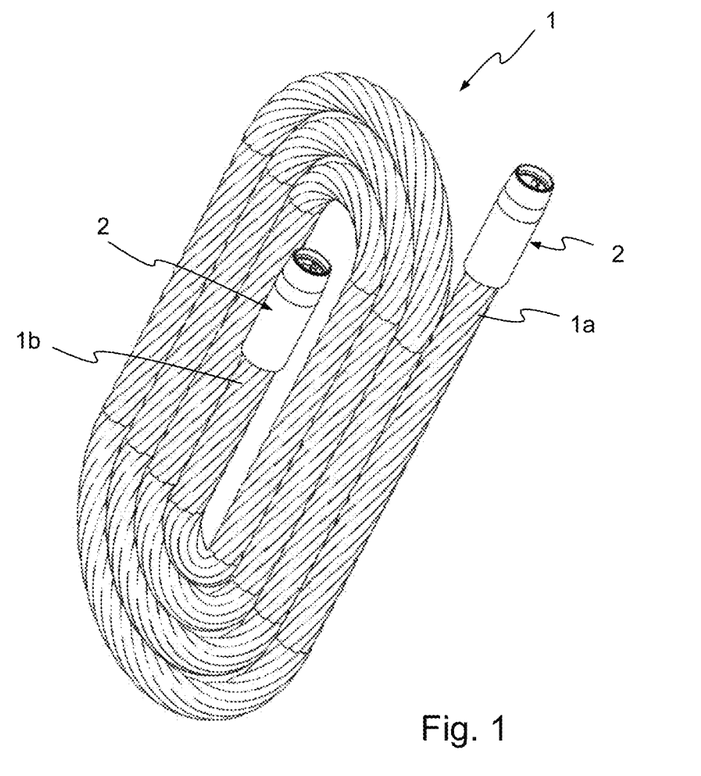
FIG. 1 is a perspective view of a rope with adapters connected to it.

In FIG. 1, an exercise rope 1 is shown. The exercise rope may be a battle rope. A first end 1a of the rope 1 is intended to be grabbed by a user. The rope 1 is provided with parts of adapter assemblies 2 in both ends 1a, 1b. The adapter assembles 2 are to be described below. In one embodiment, an opposite, second end 1b of the rope 1 is arranged to be fastened to an anchoring device (not shown). The anchoring device may be a wall, a door, a weight or any other suitable anchor. Alternatively, both ends 1a, 1b of the rope 1 could be grabbed by the user, and a middle portion of the rope laid around an anchoring device.

Figure 6A:
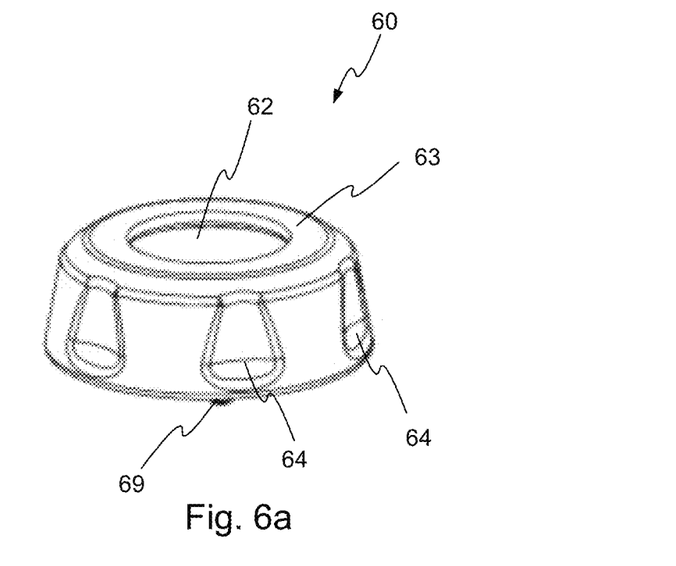
FIGS. 6a-b are perspective views of a part of an accessory connector according to one embodiment.
Figure 6B:
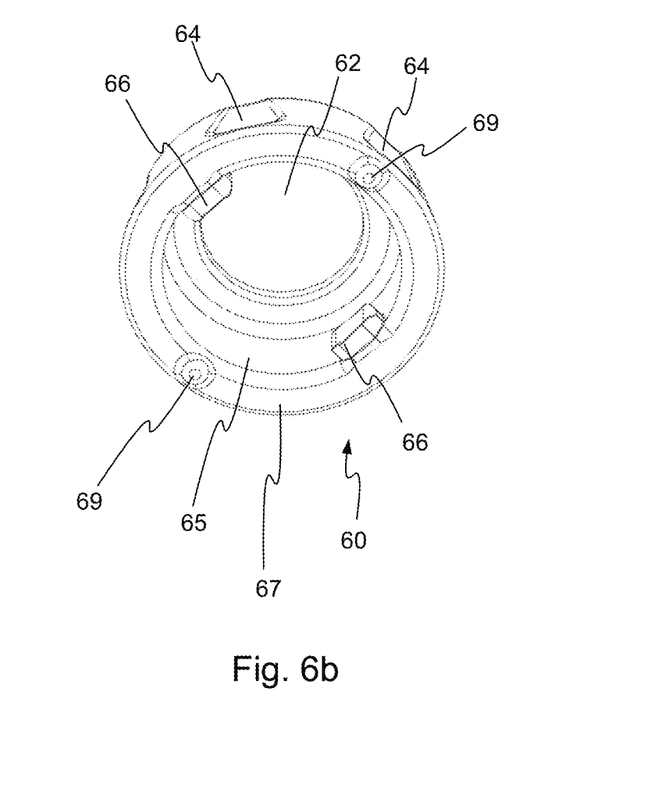

In order to facilitate a user to grip the rope 1, an adapter assembly 2 is provided, which is mountable on one end 1a, 1b of the rope 1. The adapter assembly 2 is disclosed in FIG. 2 in an exploded view together with the rope 1. In this embodiment, the adapter assembly 2 is to be arranged on the first end portion 1a of the rope 1. The adapter assembly 2 provides a user with a possibility to use different accessories together with the rope 1. The accessories may for example be a handle, a hook, grip bar or a carbine hook adapter. An example of another accessory is shown in FIG. 6.

Figure 2:
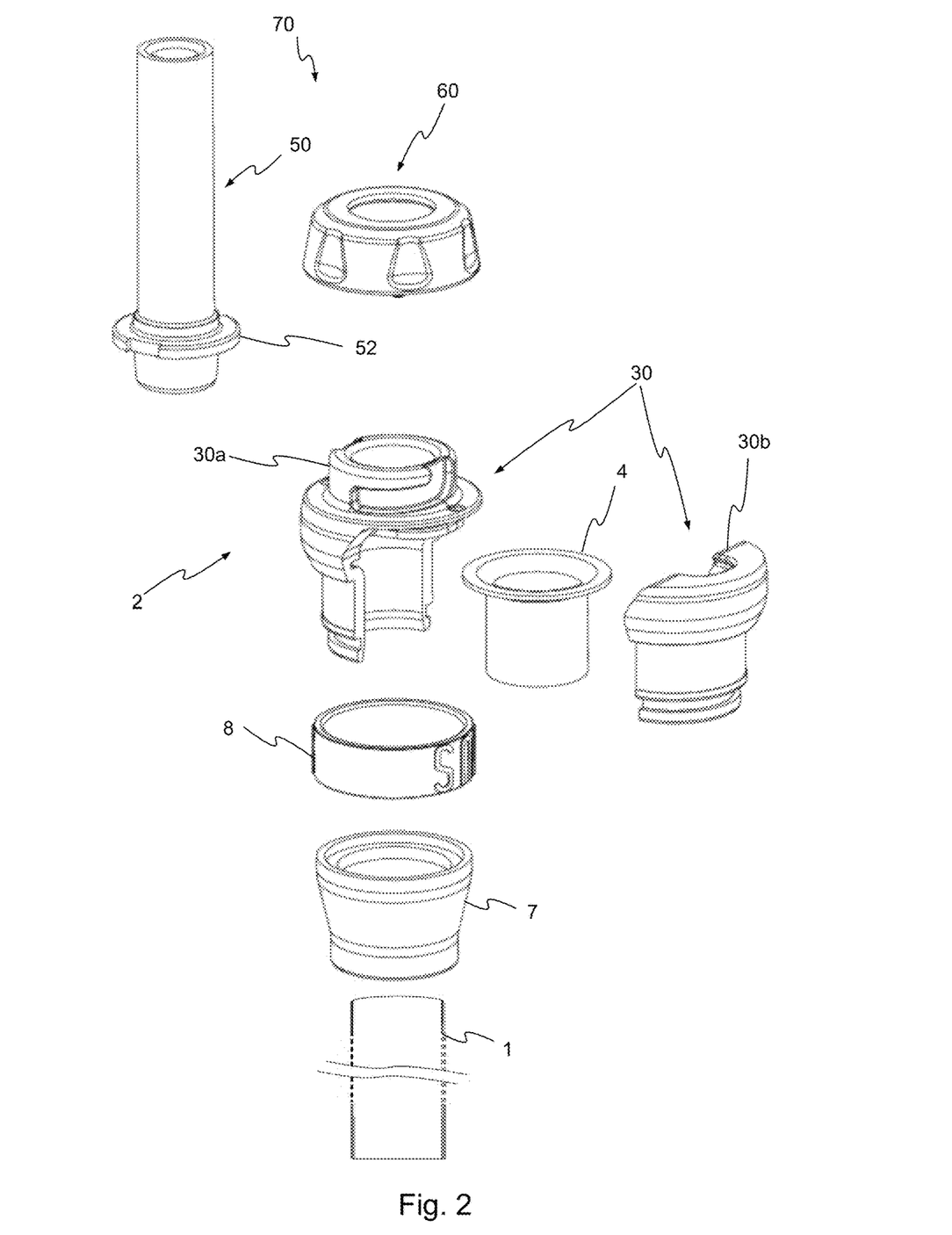
FIG. 2 is an exploded view of an adapter and a rope according to one embodiment.

As disclosed in FIG. 2, the adapter assembly 2 comprises a connection part 30, a sleeve 4, and an accessory connector 70. The accessory connector may comprise a locking unit 60 and a connector device 50. The connection part 30 comprises a first portion 30a and a second portion 30b. The connection part 30 may be seen as being formed by the first portion 30a and the second portion 30b. Once the first portion 30a and the second portion 30b are connected to each other, for example using a locking means 8, they form one connection part 30. Having the connection part 30 in two separate pieces before assembly allows for an easier mount and better fit to the rope 1.

Figure 7:
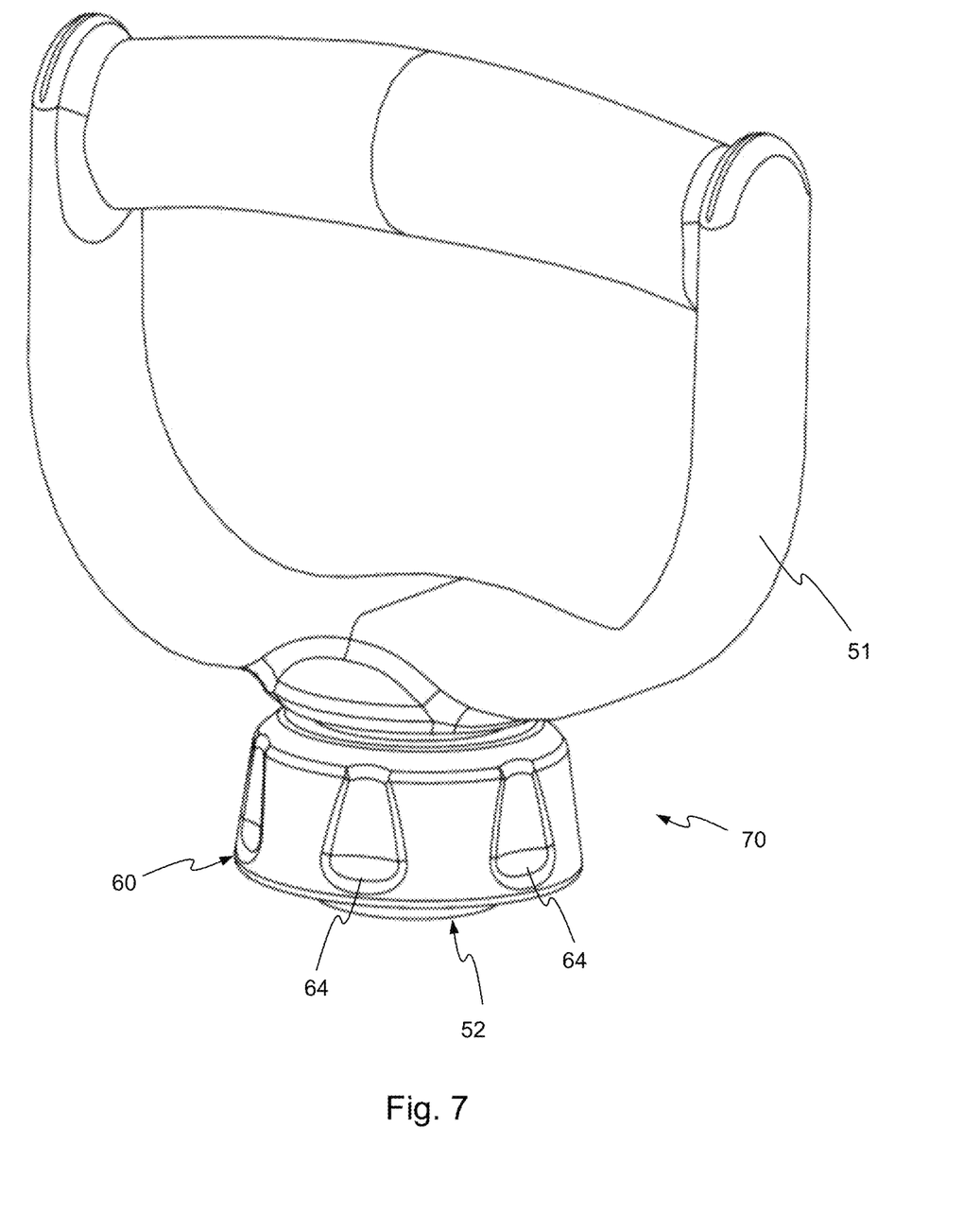
FIG. 7 is a perspective view of an accessory connector according to one embodiment.

Furthermore, the adapter assembly 2 may comprise a cover 7 and a locking means 8. As shown in FIG. 2, the accessory connector 70 may be pre-connected to an accessory, such as a straight handle as shown in FIG. 2. The accessory may also be e.g. a handle of other shapes (such as shown in FIG. 7), a hook, a grip bar, or a carbine hook. When the sleeve 4 is mounted to the rope 1, and the connection part 30 is mounted thereon, any accessory provided with an accessory connector 70 can be connected thereto.

Figure 3:
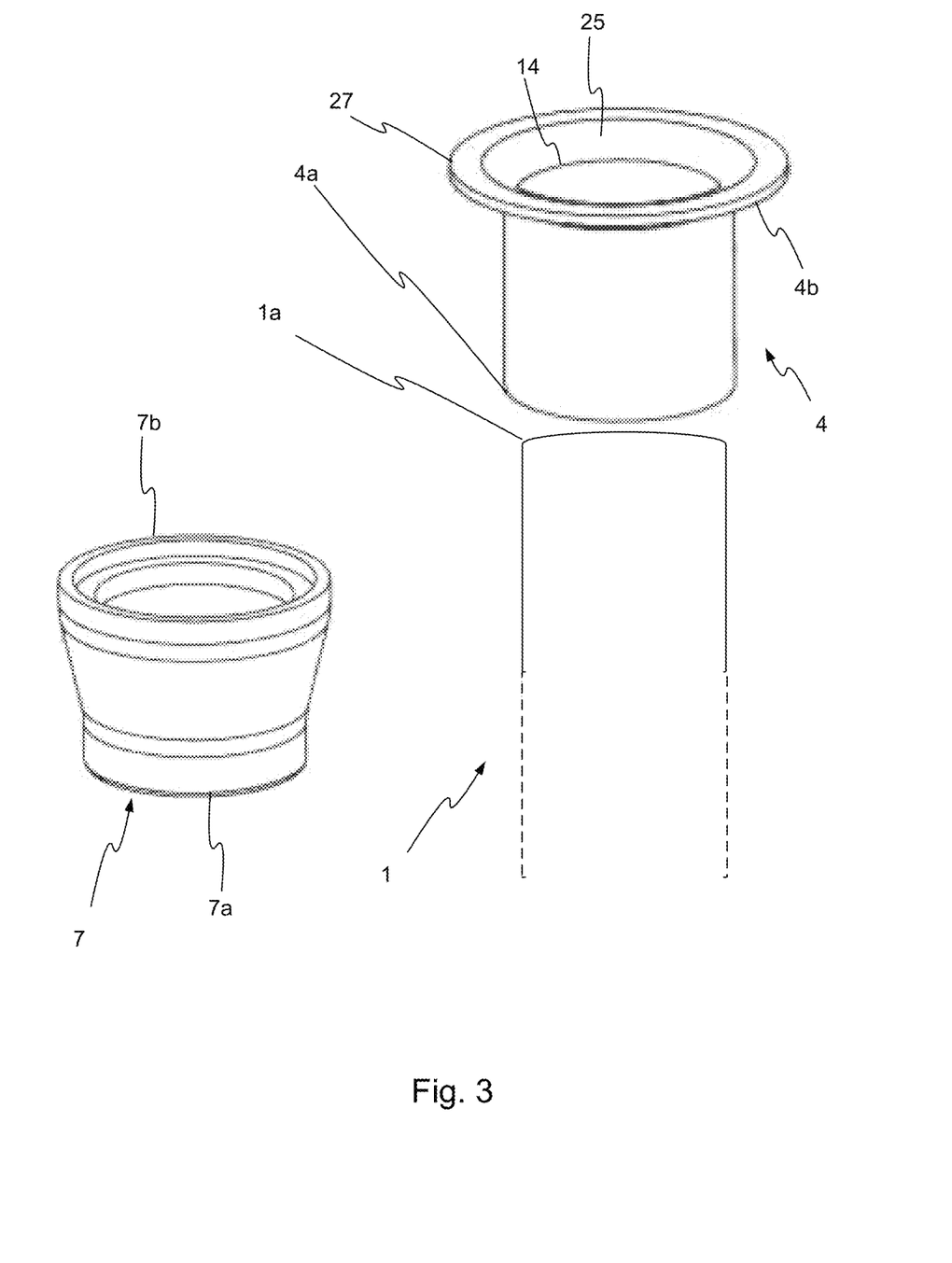
FIG. 3 is a perspective view of a rope, a sleeve and a cover according to one embodiment.

The sleeve 4 is disclosed in FIG. 3. The sleeve 4 is formed as a hollow cylinder. The sleeve 4 comprises a first end portion 4a, a second end portion 4b, an inner envelope surface 25 and an outer envelope surface 14. The sleeve 4 is preferably made of metal, such as for example steel.

The diameter is such that the sleeve 4 can fit snugly over the rope 1. In one embodiment, the inner diameter of the sleeve 4 is constant throughout the sleeve body 4. In this situation, the sleeve 4 is thus linearly pressed onto the rope 1. In an alternative embodiment, the sleeve 4 has a tapered form, where the inner diameter of the sleeve is slightly larger at its first end portion 4a than the second end portion 4b. In this situation, the sleeve 4 is conically pressed onto the rope 1.

The sleeve 4 further comprises a shoulder portion 27 provided in the second end portion 4b. The shoulder portion 27 protrudes from the second end portion 4b and extends around the outer circumference of the sleeve 4.

The sleeve 4 is designed so that it will fit into the mounting part of the connection part 30. It is preferred if the dimensions are such that the sleeve 4 cannot move in the cavity formed when the first and second portions 30a, 30b of the connection part are connected to each other.

In one embodiment, the sleeve is arranged with clearance holes (not shown). In such embodiment, the first and second portion 30a, 30b as well as the rope 1 are also provided with holes. These holes may be used by a through bolt, or similar, that is arranged into the holes in order to tighten the parts together.

In yet one embodiment, the sleeve 4 is not present. The first and second portions 30a, 30b are clamped directly onto the rope 1.

The length of the rope 1 that is inserted into the sleeve 4 may vary depending on the length of the sleeve 4 and/or the dimension of the connection part 30. The rope 1 may, for example, be inserted to the shoulder portion 27 or continue after the shoulder portion 27. Hence, the rope 1 may end in line with the shoulder portion 27 or extend from the shoulder portion 27.

During assembly, the first end 1a of the rope 1 is inserted into the first end portion 4a of the sleeve 4. Optionally, a cover 7 may be placed at least partly above the first end 1a of the rope 1 and the sleeve 4. The cover 7 comprises a first end 7a and a second end 7b. The shape of the cover 7 is preferably cylindrical with an inner diameter that increases towards the second end 7b. Once the adapter assembly 2 is assembled, the second end 7b of the cover 7 is configured to be placed towards the shoulder portion 27 of the sleeve 4. The cover 7 may be made of a flexible material such as rubber. The cover 7 may be a rubber gaiter. Preferably, the cover 7 is threaded onto the rope 1 before the sleeve 4 is attached, and the cover 7 is then moved upwards towards and partly above the sleeve 4.

One of the benefits of the cover 7 is that it can be used as a grip that provides a good and gentle grip during training. This is true even if the rope is used without the accessories 70. The length and the surface design of the grip 7 can therefore vary depending on which type of end user that will use the rope.

Figure 8:
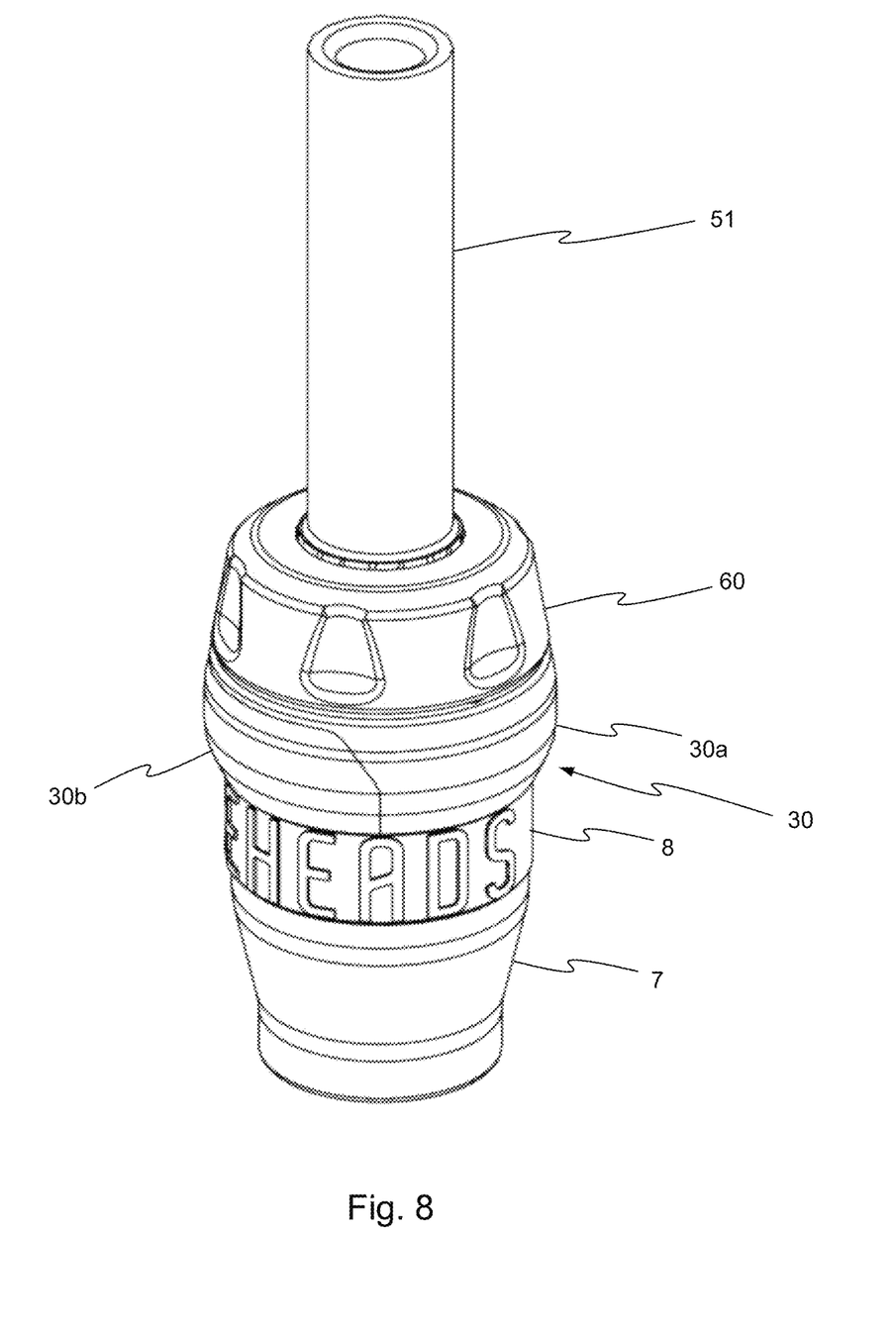
FIG. 8 shows an assembled adaptor assembly according to one embodiment.

As previously stated, the adapter assembly 2 may further comprise a locking means 8 that further connects the connecting part 30 to the sleeve 4. The locking means 8 may be arranged with a company logo or name (as shown in FIGS. 2, 4b, and 8), as this part will be clearly visible to the user. The locking means 8 also releasably connects the first and second portions 30a,30b to each so as to further increase their connection.

In one embodiment the locking means 8 is in the form of a locking ring. The locking ring 8 is preferably made of plastic, steel, aluminium and/or a composite material. The locking ring 8 is arranged to clamp the first and second portions 30a, 30b together.

In an alternative embodiment, the locking means 8 may be in the form of a hose clamp (can also be referred to as a hose clip, hose lock, a standard pipe clamp, or exhaust pipe clamp). This can also be seen as being a locking ring 8. Alternatively, the locking means 8 may be in the form of clearance holes for screw and nut or self-threaded screws and/or threaded holes in one of the portions 30a, 30b.

In yet one embodiment the locking means 8 is in the form of one or more screws that connects the first and second portions 30a, 30b to each other.

Figure 4A:
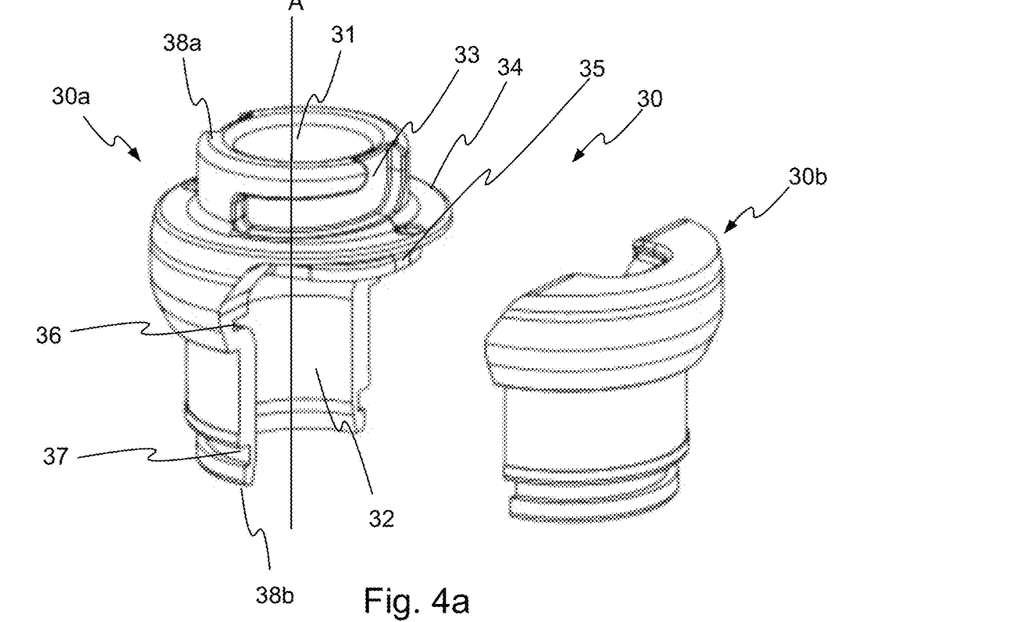
FIGS. 4a-c are perspective views of the connection part in FIG. 3.
Figure 4B:
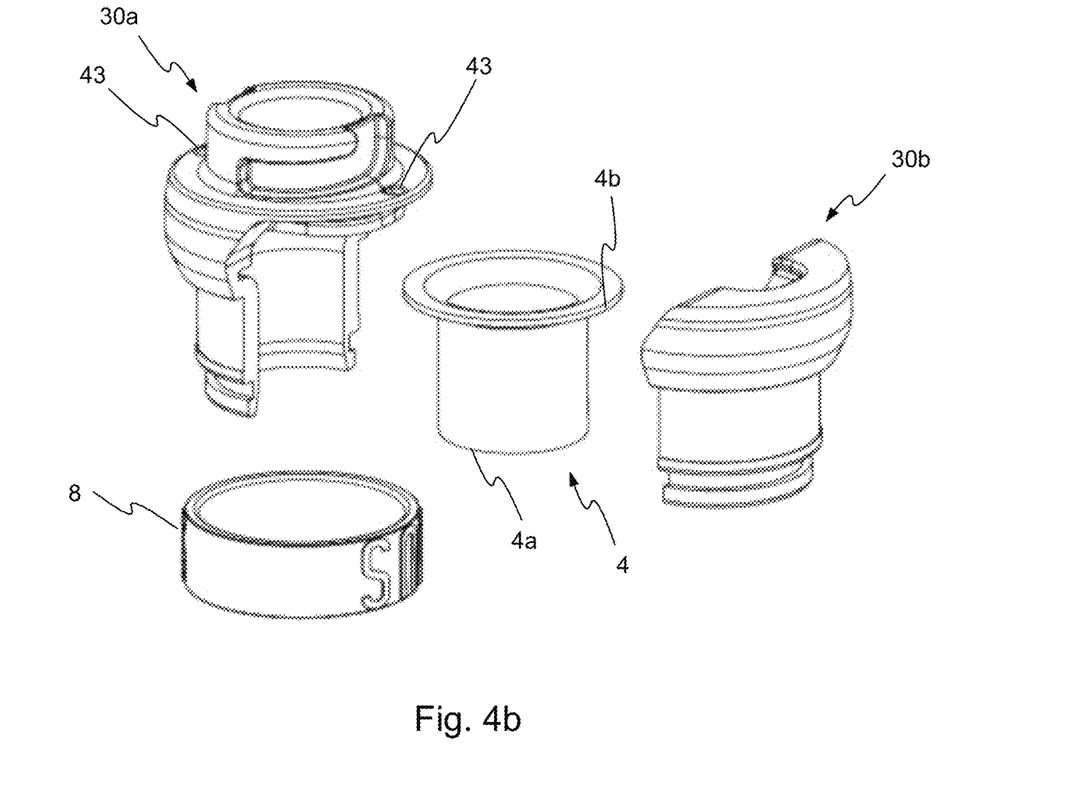
Figure 4C:
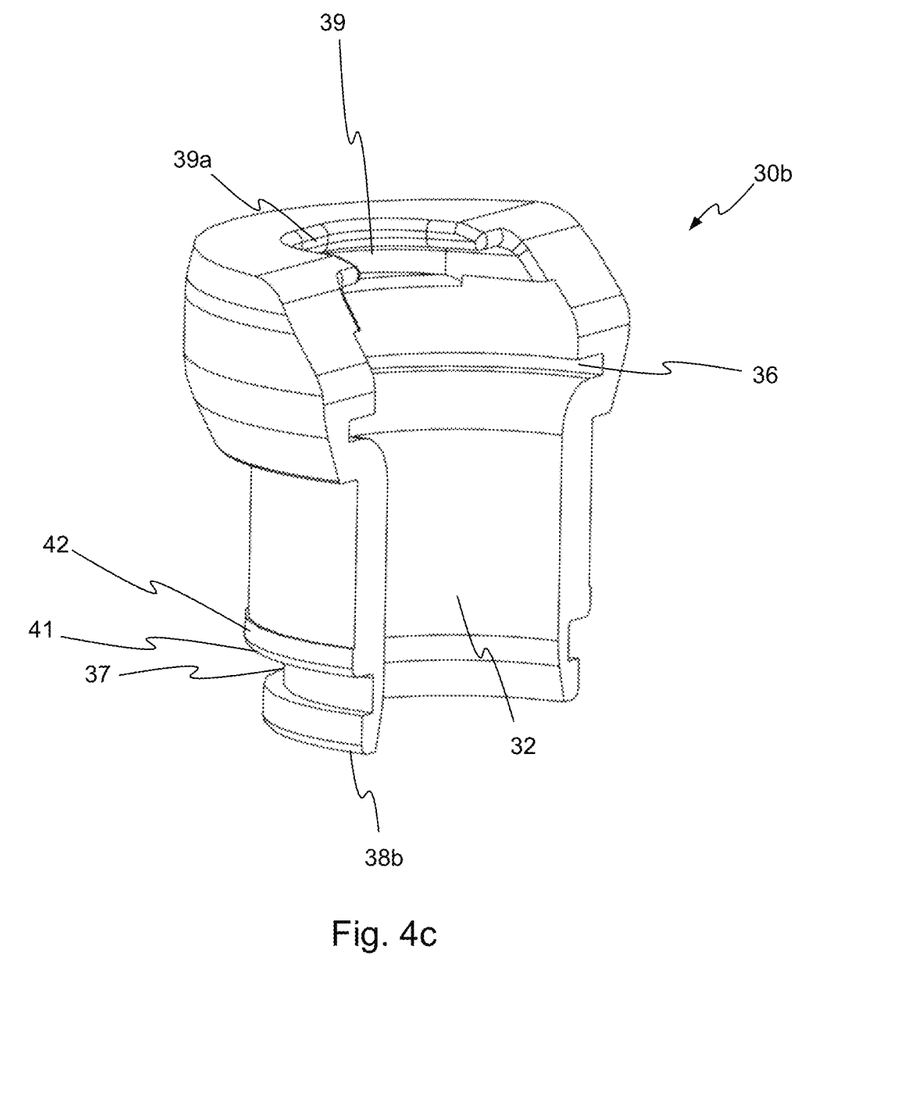

FIGS. 4a-c disclose the connecting part 30 in an exploded view. As described above, the connecting part 30 comprises a first portion 30a and a second portion 30b. In one embodiment, both the first and the second portion 30a, 30b have mainly a cylindrical shape. The connecting part 30 is preferably made of plastic, steel, aluminium aluminum and/or a composite material.

The first portion 30a of the connecting part 30 comprises a top, first, end 38a and a bottom, second, end 38b. When in a mounted state, first portion 30a of the connecting part 30 is arranged to receive the sleeve 4 such that the bottom end 38b is facing the outer envelope surface of the sleeve 4. In one embodiment, the bottom end 38b of the first portion 30a is facing the first end portion 4a of the sleeve 4. The top end 38a, in a mounted state, faces the accessory connector 70. The bottom end 38b may be arranged with a recess 37. The recess 37 extends around the outer circumference of the bottom end 38b of the first portion 30a, and can thus be seen as an outer recess 37. The recess 37 is preferably arranged to be connected to the cover 7. The cover 7 may for example have a protrusion on the inner side of the cover 7 arranged to be fixated into the recess 37. The protrusion of the cover 7 may preferably be extending along the inner circumference of the cover 7.

Figure 5A:
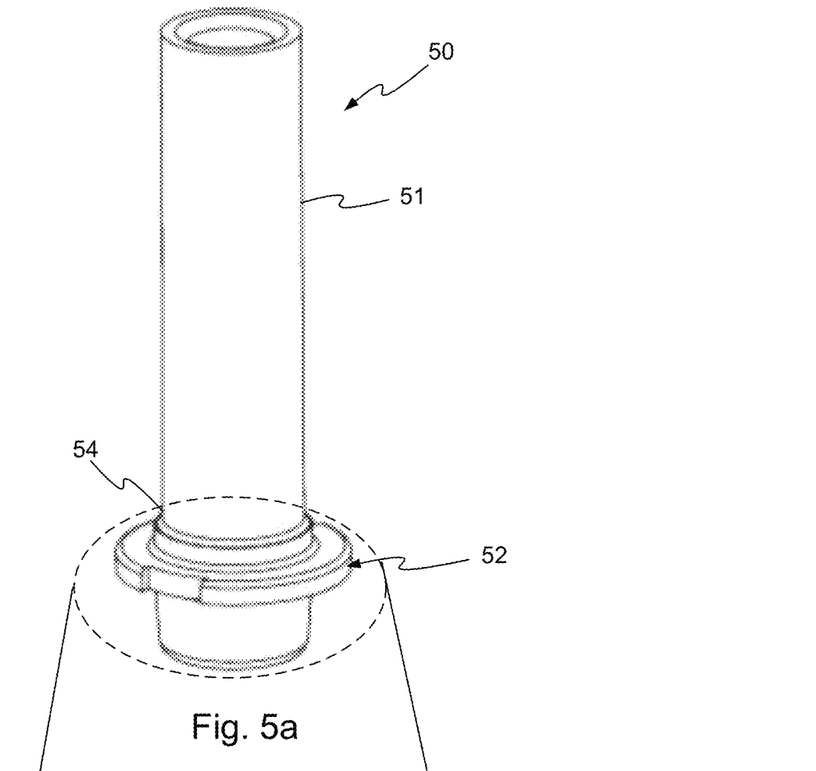
FIGS. 5a-b are perspective views of a part of an accessory connector according to one embodiment.
Figure 5B:
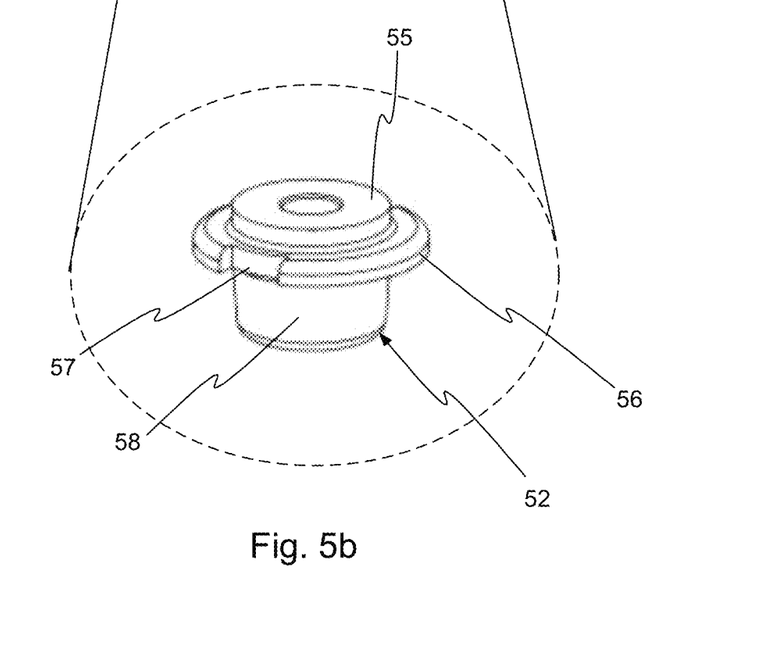

In one embodiment, the top end 38a of the first portion 30a is arranged with an opening 31. The opening has a shape and dimension being adapted to receive a lower potion 58 (as shown in FIG. 5b) of the connecting portion 52.

Figures 9A, 9B:
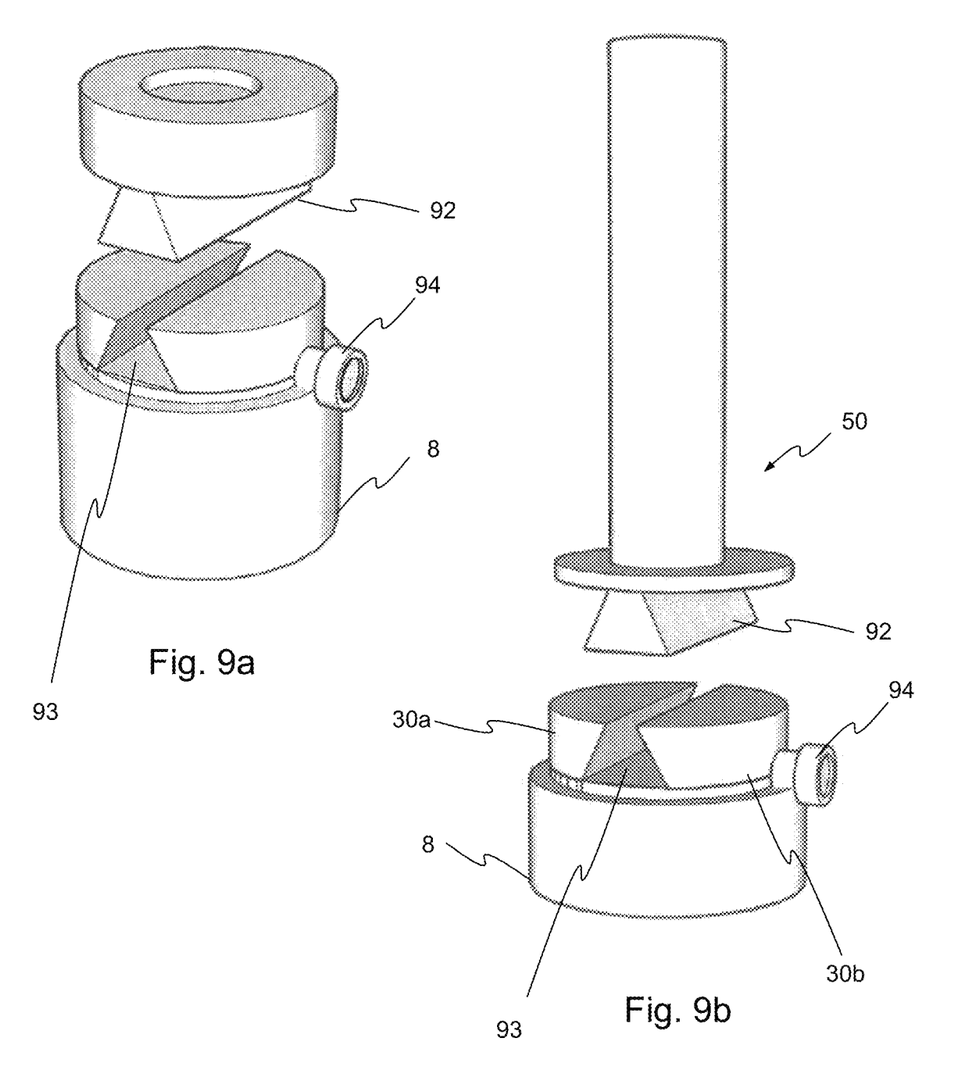
FIGS. 9a-b are perspective views of parts of an accessory connector according to one embodiment.

The top end 38a of the first portion 30a is arranged with a bayonet mount 33. The first portion 30a can be seen as a female part of the bayonet mount 33. The top end 38a of the first portion 30a is arranged with at least one slot 33. The slot is preferably L-shaped. More preferably, the slot(s) is shaped like a capital letter L with serif, hence having a short upward segment at the end of the horizontal arm. The at least one slot 33 is configured to receive a protrusion 66 (FIG. 6b) of a male part of a bayonet connection arranged on the locking unit 60 of the accessory connector 70, as will be described more with reference to FIG. 6. The angle of the at least one slot 33 is such that the more the locking unit 60 is turned around its axis, the more fixated will the connection between the accessory connector 70 and the connecting part 30 be. An alternative connection is shown in FIGS. 9a-b.

The first portion 30a of the connecting part 30 comprises an inner envelope surface 32 and an outer envelope surface. The inner envelope surface 32 is arranged with an internal recess 36. The internal recess 36 is extending along the inner circumference of the inner envelope surface 32. The internal recess 36 is preferably arranged to receive the shoulder portion 27 of the sleeve 4 when the connecting part 30 is in its mounted state.

Moreover, the first portion 30a of the connecting part 30 comprises an internal edge 35 and an annular socket 34.

The first portion 30a of the connecting part 30 further comprises at least one receiving means 43. The receiving means 43 is preferably arranged on the annular socket 34. The receiving means 43 are configured to receive at least one elevated element 69 (as shown in FIG. 6b) arranged on the locking unit 60. The first portion 30a may comprise one or a plurality of receiving means 43, however the number of receiving means 43 is preferably the same as the number of elevated elements 69. If the number of receiving means 43 are more than one, they may be arranged symmetrically along the annular socket 34 or asymmetrically arranged. In FIGS. 4a-b, the annular socket 34 is arranged with two receiving means 43 arranged opposite each other.

The elevated element 69 may be in the form of a spring plunger. The spring plunger may be made of metal, plastic or composite.

In one alternative embodiment, the elevated element 69 is arranged on the connecting part 30 and the receiving means 43 is arranged on the locking unit 60. Hence, the parts are reversed.

FIG. 4c shows the second portion 30b from another perspective compared to FIGS. 4a and 4b. The second portion 30b comprises the same bottom end 38b and inner envelope surface 32 as the first portion 30a. The second portion 30b also comprises the recess 37 extending around the outer circumference of the bottom end 38b and the internal recess 36 extending along the inner circumference of the inner envelope surface 32. In addition, the second portion 30b comprises an upper aperture 39 and an aperture edge 39a. When the first and second portions 30a, 30b are assembled together, a seal is formed between the aperture edge 39a and the internal edge 35.

The first and the second portion 30a, 30b further comprises a beveled edge 41 and a locking edge 42. The beveled edge 41 and the locking edge 42 both extend around the outer circumference of the first and second portions 30a, 30b.

Both the beveled edge 41 and the locking edge 42 are arranged slightly above the recess 37. The locking edge 42 can be seen as an elevated circular edge to which the locking ring 8 can be pressed above. Hence, the locking edge 42 is arranged to keep the locking ring 8 in position.

When mounted, the first portion 30a and the second portion 30b creates a cylindrical connecting part 30 creating a cavity into which the sleeve 4 is clamped. Hence, the connecting part 30 is, when mounted, in the form of a, at least partly, hollow cylinder. When the first portion 30a and the second portion 30b are connected to each other, the inner envelope surfaces 32 of the two portions create a cavity. The cavity is arranged to receive the sleeve 4. The diameter of the cavity created by the inner envelope surface 32 of the first and second portion 30a, 30b is slightly larger than the outer diameter of the sleeve 4.

The cavity is enclosed by the first and second portions 30a, 30b at its sides. Moreover, optionally, the cavity may be enclosed by the internal edge 35 of the first end portion 30a at its top. Hence, the cavity can be seen as a recess of the connecting portion 30 extending from its bottom end 38b arranged to receive the rope and the sleeve 4. The cavity extends along the vertical axis A.

To summarize, in the embodiment shown in FIGS. 4a-c, the first and the second portions 30a, 30b thus each comprises an internal recess 36, an inner envelope surface 32, recess 37, locking edge 42 and an internal edge 35 and an annular socket 34 with a beveled edge 41. Additionally, the first portion 30a comprises an opening 31, and a bayonet mount 33 having at least one slot, as well as at least one receiving means 43.

The accessory connector 70 comprises a connector device 50 and a locking device 60 (as described more in detail with reference to FIGS. 6a-b). In FIG. 5a, a connector device 50 of an accessory connector 70 is disclosed. The connector device 50 comprises a connection portion 52 and an accessory portion 51. The accessory portion 51 can be provided with any suitable type of accessory, e.g. a handle, a hook, a grip bar, or a carbine hook adapter. The accessory may be made in a plastic material or by a fabric. The accessory may additionally be made by a metal, such as aluminum. In a preferred embodiment, the material of the accessory is nylon. The manufacturing methods can be cast, turned, milled, pressed, forged, or in fabric sew and/or glued.

The accessory portion 51 of the accessory connector 70 is in this embodiment a cylindrical elongated handle, but it should be understood that other accessories could be used as well. Another example is shown in FIG. 7. Many other accessories are possible, and accessories may be custom-made with an accessory connector 70 connected thereto.

The accessories connector 70 may be a sled for pulling weights where the connecting portion 52 shown in FIG. 5b and locking unit 60 are mounted on both sides of the weight sled (front and rear). This allows for a quick and easy mounting and disassembly between the training cycle with said weight sled and rope 1.

The connecting portion 52 is seen in an enlarged view in FIG. 5b. The connecting portion 52 comprises a top surface 55, an annular flange 56 and a lower portion 58. The connecting portion 52 may further comprise a recess 57 arranged at the annular flange 56.

In FIGS. 6a and 6b, a locking unit 60 is disclosed. The locking unit 60 comprises an opening 62, an upper edge 63 and at least one notch 64. The locking unit 60 is configured to be arranged on top of the lower part 54 of the connector device 50 in order to create a fixture. Hence, the locking unit 60 is configured to be arranged on top of, or in close conjunction with, the connecting portion 52. The at least one notch 64 facilitates the grip when engaging the locking unit 60 in the connecting part 30 to create said fixation.

FIG. 6b shows the locking unit 60 seen from below. The locking unit 60 has an internal envelope surface 65, and at least one protrusion(s) 66 extending from said surface 65. The protrusion 66 is configured to be inserted into the at least one slots 33 on the first portion 30a of the connecting device 30. Hence, the locking unit 60 acts as the male bayonet portion in a bayonet connection between the locking unit 60 and the connecting device 30. Further, the shape and positioning of the protrusions 66 corresponds to the shape and positioning of the recesses 57 arranged on the adaptor assembly 52.

It is understood that the locking unit 60 may comprise at least one protrusion 66 as well as several protrusions 66, such as for instance two, three, four or five protrusions 66. In such case, the first portion 30a of the connecting part 30 comprises the same number of slots 33 and the connecting portion 52 comprises the same number of recesses 57.

In one embodiment, no protrusion(s) are present in the locking unit 60. Instead, the protrusion(s) 66 are replaced by openings (not shown). The openings may be threaded holes or clearance holes. The openings are suitable to receive a bolt, spring cotter, clevis pin, steel ball lock hitch pin or pin with drop cam. In this embodiment, this is used to connect the locking unit 60 to the top end 38a of the connecting device 30

The locking unit 60 also comprises a bottom edge 67. The bottom edge 67 is preferably arranged with at least one elevated element 69. The bottom edge 67 may comprise one or a plurality of elevated element 69, however the number of elevated element 69 is preferably the same as the number of receiving means 43. If the number of elevated element 69 are more than one, they may be arranged symmetrically along the bottom edge 67 or asymmetrically arranged. In FIG. 6b, the bottom edge 67 is arranged with two elevated elements 69 arranged opposite each other. The elevated element(s) 69 locks into the receiving means 43 once the at least one protrusion 66 has reached its final inner position in the slot 33, and the connection between the elevated element(s) 69 and the receiving means 43 thus provides an extra connecting arrangement between the locking device 60 and the connecting element 30.

An assembled accessory connector 70 is shown in FIG. 7. The accessory portion 51 in FIG. 7 is another type of handle than that shown in FIG. 5a. The locking unit 60 is arranged beneath the accessory portion 51. The bottom of the connection portion 52 is seen under the locking unit 60. The locking unit 60 is arranged on top of the connection portion 52 of the accessory connector 70.

With reference to FIG. 8, an assembled adaptor assembly 2 is shown. When the adaptor assembly 2 is mounted, the visible parts are, from top to bottom, the accessory portion 51, the locking unit 60, the first and second connecting portions 30a, 30b, forming the connecting part 30, the locking ring 8 and the cover 7. The sleeve 4 is housed within the connecting part 30 and is therefore not visible in the assembled state. Also the connecting portion 52 is not to be seen in the assembled state, since it is housed beneath the locking unit 60 and inside the opening 31 of the connecting part 30.

The assembly of the adaptor assembly 2 will now be described in more detail. The first end 1a of the rope 1 is inserted into the first end portion 4a of the sleeve 4. Preferably, if a cover 7 is to be used, it is threaded onto the rope 1 before inserting the first end 1a into the sleeve 4.

The sleeve 4 is then arranged in the cavity created by the first or second portion 30a, 30b of the connection part 30. The sleeve 4 is preferably arranged in the space forming the cavity when the two portions 30a, 30b are separated from each other. The shoulder portion 27 of the sleeve 4 is engaged in the first internal recess 36 of the first and second portions 30a, 30b of the connection part 30. If a locking ring 8 is used, it is placed beneath the first and second portions 30a, 30b and is preferably also threaded on top of the cover 7 of onto the rope 1 before arranging the sleeve 4 in the first and second portions 30a, 30b. When the sleeve 4 is arranged correctly in the first and second portions 30a, 30b, the locking ring 8 is moved towards the connection part 30 and is forced into engagement with the locking edge 42 extending around the outer circumference of the connection part 30.

Subsequently, the connecting portion 52 at the lower part 54 of the connector device 50 is inserted into the opening 31 of the connection part 30. The lower portion 58 has dimensions corresponding to fit into the opening 31 of the first portion 30a. The protrusions 66 on the internal surface 65 of the locking unit 60 covering the connecting portion 52 (as shown in FIG. 6) are aligned to match the positions of the recesses 57. The recesses 57 and the slots 33 are aligned with the protrusions 66 such that the protrusions 66 can engage in the slots 33. The protrusions 66 are engaged in the slots 33 by pressing the locking unit 60 downwards towards the connection part 30 and twisting the locking unit 60 such that the protrusions 66 follow the L-shaped slot 33. The bottom edge 67 of the locking unit 60 thus moves towards the annular socket 34 of the first portion 30a during the process of engaging the protrusions 66 in the slot 33.

When this is completed, the adaptor assembly 2 will have the appearance as shown in FIG. 8. The method provides for efficiently connecting and releasing an accessory connected to an accessory connector to an exercise rope. It is thus possible to use different accessories with the exercise rope, increasing its versatility.

FIGS. 9a-b shows a slightly modified embodiment of the adapter. The adapter the assembly comprises a connection part 30 being formed by a first portion 30a and a second portion 30b, each having a bottom end 38b, wherein the first and the second portion 30a, 30b of the connection part 30 forms, at its bottom end 38b, a cavity configured to receive an end portion 1a of said rope 1 in a manner as has been described with reference to the other embodiments disclosed herein. Moreover, the details of the locking means 8 described above are applicable to this embodiment as well. In this example of the embodiment, the locking means 8 is in the form of a locking ring arranged to connect the first portion 30a and the second portion 30b to each other.

In FIGS. 9a-b, the top end 38a of the connection part 30 is configured to releasably connect the accessory connector 70 in an alternative way. Here, the top end 38a of the connection part 30 is in the form of a groove 93. The groove 93 may be in the form of a dovetail rail. The groove 93 may be arranged on the first portion 30a, the second portion 30b or be created by the combination of the first portion 30a and the second portion 30b when connected by the locking means 8. Hence, in this embodiment, the opening 31 and the slot 33 of the connection part 30 as for example shown in FIG. 4a, are replaced by the groove 93.

The groove 93 is preferably a dovetail rail. The dimensions of the groove 93 can be adapted using the adjustment means 94 arranged on the connection part 30. In one embodiment, the male of the dovetails rails 93 are preferably placed at the top of connecting part 30.

In this embodiment, the connector device 50 is arranged with a protruding part 92 corresponding to the groove 93. The grove 93 preferably has a design and dimension that is arranged to receive the lower portion of the connecting portion 52. The protruding part 92 can be seen as a female dovetail rail 92. In one embodiment, the groove 93 and the protruding part 92 are connected as a dovetail joint. In this way, the top end 38a of the connection portion 30 is arranged with a quick release clamp for a fast and secure connection to the accessory connector 70.

The locking unit 60 is applied to the connection portion 30 from one of the sides of the dovetails rails and the adjustment means 94 are arranged to tighten the protruding part 92 so that a solid attachment is achieved. The locking unit 60 may be a single part or may be included in in a single accessory as is shown in FIG. 7.

In one embodiment, the dovetails rails are combined with additional fastening means. The fastening means may for example be a spring cotter, a clevis pin or a pin with a drop cam. The fastening means may be arranged into clearance holes in the groove 93, or male dovetails rails part, and may be attached on or two sides of the dovetails rails.

Although not shown, it should be understood that the groove 93 could also be for example a T-shaped groove or any similar technical solution allowing for a quick mount.

In one embodiment, not shown, yet another connection method is provided in order to releasably connect the accessory connector 70 to the rope 1. In this embodiment, the top end 38a of the first portion 30a is arranged with a shoulder portion that extends around the outer circumference. Moreover, the bottom end 67 of the locking unit 60 comprises a shoulder portion, that extends around the outer circumference. In this embodiment, these two shoulder portions are arranged to be connected by a pipe clamp. The pipe clamp allows for a quick release connection. The pipe clamp is preferably arranged so that the two shoulder portions meet. The pipe clamp is threaded over either of the connecting portion 30 or the accessory connector, and is tightened by the quick release handle on the pipe clamp. The pipe clamp may be a fixated part on either the connecting portion 30 or the locking unit 60. Alternatively, the pipe clamp is a separate part.

Hence, the present invention can be achieved with different kinds of releasably connections between the accessory connector 70 and the adapter assembly, such as a bayonet mount, a dovetails rail connection or with the use of a pipe clamp.

The invention claimed is:

1. An adapter assembly for releasably connecting an accessory connector to an exercise rope, the adapter assembly comprising:
   a connection part having a top end and a bottom end; said connection part being comprised of a first portion and a second portion connected together by a locking means, said first and second portions each having a bottom end and a top end, wherein the bottom end of the first portion and the bottom end of the second portion define a cavity of said connection part which is configured to receive an end portion of said exercise rope, the top end of the connection part being configured to form a releasable connection with the accessory connector; and a cover adapted to cover an interface between the exercise rope and the locking means.

2. The adapter assembly according to claim 1, further comprising a sleeve configured to be arranged on the end portion of the exercise rope and to be received in the cavity of the connection part, wherein the sleeve comprises a shoulder portion configured to interact with an inner surface of the cavity.

3. The adapter assembly according to claim 2, wherein the cavity of the connection part comprises an internal circumferential recess in which the shoulder portion on the sleeve is configured to be inserted.

4. The adapter assembly according to claim 1, wherein the connection part is provided with at least one slot.

5. The adapter assembly according to claim 4, wherein the slot is arranged on the first portion.

6. The adapter assembly according to claim 1, wherein the accessory connector comprises a locking unit having at least one protrusion configured to engage with the connection part so as to form the releasable connection.

7. The adapter assembly according to claim 6, wherein the connection part is provided with at least one slot and wherein the accessory connector is connectable to the connection part by a bayonet mount formed by the at least one protrusion provided on the locking unit and the at least one slot provided on the connection part so as to form the releasable connection.

8. The adapter assembly according to claim 1, wherein the releasable connection between the accessory connector and the top end of the connection part is provided by a bayonet mount.

9. The adapter assembly of according to claim 1, wherein said locking means at least in part surrounds said first and second portions of the connection part.

10. A method for releasably connecting the adapter assembly according to claim 1 to the exercise rope, the method comprising the steps of:
inserting a first end of the exercise rope into the cavity of the connection part, wherein the first end of the rope is inserted into a bottom end of the connection part,
arranging a locking means such that the locking means connects the first and second portions together, and
releasably engaging an accessory connector to a top end of the connection part;
wherein the locking means is in the form of a locking ring, the method further comprising the step of passing the locking ring around the first portion and the second portion of the connection part such that the locking ring connects the first and second portions together.

11. A method for releasably connecting the adapter assembly according to claim 1 to the exercise rope, the method comprising the steps of:
threading the cover onto the first end of the exercise rope;
inserting the first end of the exercise rope into the cavity formed of the connection part, wherein the first end of the exercise rope is inserted into the bottom end of the connection part,
arranging the locking means such that the locking means connects the first and second portions of the connection part together,
moving the cover so that it covers the interface between the exercise rope and the locking means, and
releasably engaging the accessory connector to the top end of the connection part.

12. The method according to claim 11, wherein the method further comprises the step of:
inserting the accessory connector into the first portion of the connection part such that at least one protrusion of a locking unit of the accessory connector releasably engages at least one slot in the first portion of the connection part.

13. The method according to claim 12, further comprising the steps of:
pressing the locking unit of the accessory connector towards the connection part such that the at least one protrusion provided on the locking unit is threaded through a recess of the accessory connector; and
rotating the accessory connector such that the at least one protrusion engages with the at least one slot.

14. The method according to claim 12, further comprising the steps of:
pushing the locking unit of the accessory connector towards the connection part such that the at least one protrusion provided on the locking unit is advanced through a recess of the accessory connector; and
rotating the accessory connector such that the at least one protrusion engages with the at least one slot.

15. The method according to claim 11, further comprising, before the step of inserting the first end of the exercise rope into the cavity:
inserting the first end of the rope into a sleeve; and
engaging the sleeve in the cavity formed by the first portion and the second portion.

16. The method according to claim 11, wherein the locking means is in the form of a locking ring, the method further comprising the step of:
passing the locking ring around the first portion and the second portion of the connection part such that the locking ring connects the first and second portions together.

17. An adapter assembly for releasably connecting an accessory connector to an exercise rope, the adapter assembly comprising:
a connection part being formed by a first portion and a second portion, said first and second portions each having a bottom end and top end, wherein the bottom end of the first portion and the bottom end of the second portion of the connection part in combination define a cavity configured to receive an end portion of said exercise rope, wherein the connection part has a top end and a bottom end being defined by the respective bottom ends and top ends of the first and second portions, and
a locking means arranged to connect the first portion and the second portion to each other,
wherein the top end of the connection part is configured to form a releasable connection with the accessory connector,
wherein the locking means is in the form of a locking ring.

* * * * *